United States Patent [19]

Inoue

[11] 4,208,256
[45] Jun. 17, 1980

[54] FLUID PUMPING CONTROL METHOD AND APPARATUS FOR MACHINE TOOLS

[75] Inventor: Kiyoshi Inoue, Tokyo, Japan

[73] Assignee: Inoue-Japax Research Incorporated, Yokohamashi, Japan

[21] Appl. No.: 8,093

[22] Filed: Jan. 31, 1979

[30] Foreign Application Priority Data

Feb. 8, 1978 [JP] Japan ................ 53-13768[U]

[51] Int. Cl.² .................................... C25F 3/00
[52] U.S. Cl. ...................... 204/129.2; 204/129.7; 204/224 M; 204/229; 211/69 D
[58] Field of Search .......... 204/129.25, 129.7, 224 M, 204/129.2, 229, 69 D; 219/69 G

[56] References Cited

U.S. PATENT DOCUMENTS

| 3,553,415 | 1/1971 | Girard | 204/129.7 X |
| 3,630,877 | 12/1971 | Koike et al. | 204/224 M |
| 3,699,303 | 10/1972 | Kauffman et al. | 219/69 D |

FOREIGN PATENT DOCUMENTS

| 3812829 | 5/1961 | Japan | 204/224 M |
| 3812830 | 5/1961 | Japan | 204/224 M |

Primary Examiner—John H. Mack
Assistant Examiner—D. R. Valentine
Attorney, Agent, or Firm—Karl F. Ross

[57] ABSTRACT

A method and control system for a machining fluid pump in which the machining fluid is displaced by the pump to the machining site. The pump speed is controlled electrically, usually in response to a machining parameter or to a machining liquid parameter to minimize pumping of the liquid and heat rise therein.

8 Claims, 1 Drawing Figure

FLUID PUMPING CONTROL METHOD AND APPARATUS FOR MACHINE TOOLS

FIELD OF THE INVENTION

The present invention relates to a fluid pumping control method and apparatus for machine tools and, more particularly, to an improved method of and apparatus for controllingly supplying a machining fluid from a reservoir therefor to a machining zone in a machine tool by means of a pump driven by an electric motor.

BACKGROUND OF THE INVENTION

A machine tool for most applications commonly requires a supply system for feeding a machining fluid stored in a reservoir to a machining zone constituted by a tool member and a workpiece. The machining fluid generally serves as a coolant and cutting medium as well as a flushing medium which carries away machined chips, particles and other machining products from the machining zone to keep the latter refreshed while allowing it to undergo continued machining or cutting actions under satisfactory conditions.

In conventional fluid pumping systems used with a machine tool, it has been a common practice to utilize a pump driven at constant RPM by an electric motor with a constant input power and, when the quantity of the machining fluid delivered to the machining zone is to be regulated or modified, a check valve, return valve, relief valve and/or other similar valve arrangements have been employed to control the output pressure of the pump. Since the pump is speed driven at constant, it has had to be driven at its maximum rating to be effective to produce a maximum fluid pressure required in a given course of machining operation or among a plurality of desired machining operations to be carried out by the machine tool.

One problem associated with conventional systems of this sort is that the machining fluid, while being circulated through a fluid conduit system, tends to rise in temperature due to its frictional contact with the internal walls of the conduits. Such temperature rise is disadvantageous in that it produces alteration in machining quality and expansion of machine components with which the fluid comes directly or indirectly into contact and thus leads to unsatisfactory and inaccurate machining results. In addition, with prior systems in which an excessive output of the pump is regulated by valve arrangements there is considerable heat loss in the pump driving power because of the additional fluid conduits.

OBJECTS OF THE INVENTION

It is accordingly the object of the present invention to provide an improved fluid pumping control method and apparatus whereby the temperature rise of the machining fluid is held to a minimum during a given machining operation.

SUMMARY OF THE INVENTION

The object of the present invention is attained by a method of controllingly supplying a machining fluid to a machining zone from a reservoir whereby the rate of rotation of the pump is controlled so as to maintain the machining fluid to be delivered to the machining zone at a required minimum.

The method according to the invention comprises the steps of applying an input to an electric motor for driving the fluid delivery pump and modifying the input to the electric motor for controlling the output pressure of the pump to regulate the rate of delivery of the machining fluid to the machining zone. The input to the electric motor may be modified either for switching the machining operation from one given mode to another or during a given course of machining operations.

An apparatus for controllingly supplying the machining fluid to a machining zone in a machine tool according to the present invention comprises a reservoir for the machining fluid, a fluid feed conduit between the reservoir and the machining zone, an electric motor having a variable input and a pump with a rotor for driving by the electric motor for feeding the machining fluid for the reservoir to the machining zone through the fluid conduit and means for modifying the input to the electric motor to control the output pressure of the pump, thereby regulating the rate of delivery of the machining fluid to the machining zone.

Specifically, the input modifying means may include a switch adapted to switch over the input to the electric motor from one magnitude to another for switching the machining operation from one given mode to another. Alternatively, the input modifying means may include a sensor responsive to the rate of flow of the machining fluid at an output line of the pump to provide a control signal for modifying the input to the electric motor. Where the machine tool is constituted by an electroerosion machine, the modifying means may alternatively or additionally include a further sensor responsive to a machining current passing between a tool electrode and a workpiece across a machining gap constituting the machining zone filled with the machining fluid, to provide an electrical signal for modifying the input to the electric motor.

BRIEF DESCRIPTION OF THE DRAWING

The sole FIGURE of the accompanying drawing illustrates in a schematic manner and for illustrative purposes only, an electroerosion machine incorporating a fluid pumping control system embodying, in a certain exemplary form, the principles of the present invention.

SPECIFIC DESCRIPTION

Figure 1:
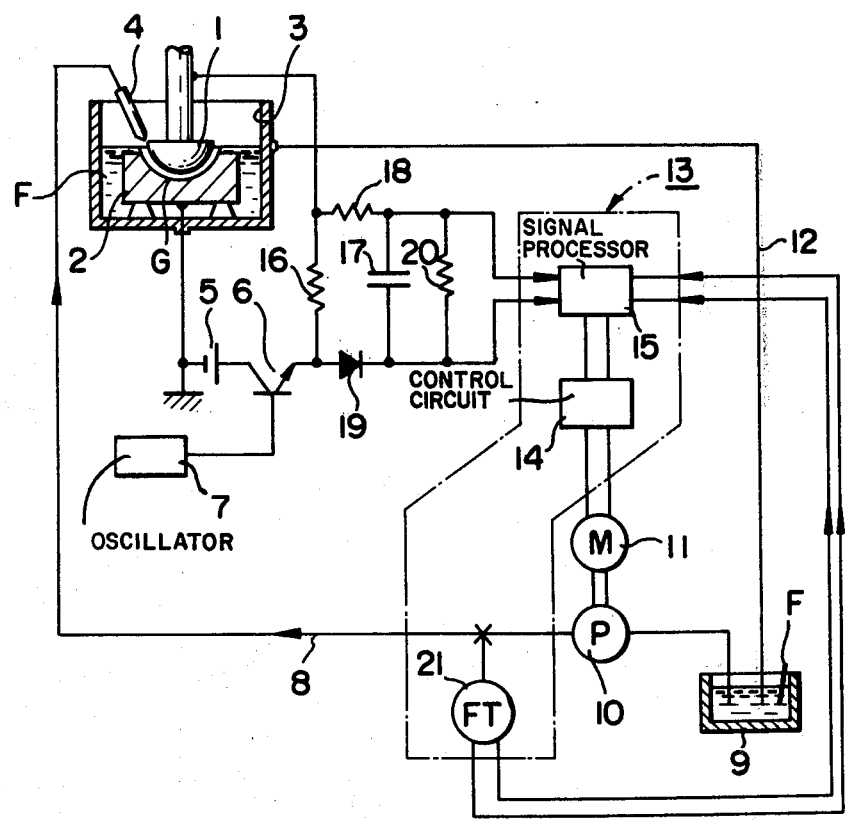

The electroerosion machine as shown includes a tool electrode 1 which is juxtaposed with a workpiece 2 across a machining gap formed therebetween constituting a machining zone in a work tank 3 receiving a machining fluid F, i.e. a liquid dielectric or electrolyte. A fluid flushing nozzle 4 is oriented toward the electroerosion gap G to inject the machining fluid F thereto.

A machining direct-current power supply 5 is connected to the tool electrode 1 and the workpiece 2 in series with a switching element 6 shown constituted by a power transistor which is controlled by a control pulsing circuit, e.g. an oscillator 7 to trigger the switch 6 alternately on and off so that a series of machining pulses are applied across the machining gap G filled with the machining fluid F to remove material from the workpiece 2.

As machining proceeds, the tool electrode 1 carried by a machining head (not shown) is advanced relative to the workpiece 2 by a servomechanism (not shown) to maintain the spacing of the machining gap G therebetween substantially constant.

Machining chips, tar and gases produced by the electroerosion process are carried away from the machining gap G by the machining fluid F supplied from the flushing nozzle 4 so that the region of the machining gap G may be kept rinsed and maintain a substantially predetermined dielectricity or conductivity when each individual machining pulse is applied thereto.

The machining fluid F is fed to the flushing nozzle 4 via a supply conduit 8 from a reservoir 9 by means of a pump 10 with a rotor driven by a direct-current electric motor 11 and the fluid F in the work tank 3 is returned via a return conduit 12 to the reservoir 8 for recycling. A filter (not shown) is usually included in either line 8 or 12 to assure that the machining fluid supplied to the machining zone is decontaminated or kept free from machining chips, tar, gases and other foreign matters.

In accordance with the principles of the present invention, the electric motor 11 is provided with a variable input means 13 designed to modify the rate of rotation of the rotor of the pump 10, thereby controlling the output pressure thereof and hence regulating the rate of delivery of the machining fluid F drawn from the reservoir 9 to the machining gap G without a principal resort on a check valve, return valve, relief valve or any other pump pressure adjusting valve arrangement which has been used conventionally associated with the fluid supply pumping unit in a machine tool.

The regulation and modification of the output pressure of the fluid delivery pump 10 is required when switching the machining operation from one given mode to another and also when a change in machining conditions in the machining gap G arises in a given course of machining operation. For these purposes, since no principal resort is made on the use of any fluid checking or shunting valve arrangement, the power required for driving the pump 10 and hence heat loss thereof is advantageously held to a minimum while allowing a required minimum quantity of the machining fluid F to be delivered to the machining zone G at constancy and with assurance.

The variable input means 13 to the electric motor 11 according to the present invention may, as illustrated, advantageously make use of a control circuit 14 responsive to the machining current flow through the machining gap G and/or to the rate of flow of the machining fluid F through the supply line 8. Thus, in the illustrated embodiment, the control circuit 14 is fed by a signal processing circuit 15 responsive to one or both of these variables. To this end, a resistor 16 is provided in series with the power supply 5 and the machining gap G to serve as a machining current sensor with a capacitor 17 being connected across the resistor 16 via a charging resistor 18 and a unidirectional current conducting element 19, e.g. a diode, to develop a charging voltage E at an output resistor 20 connected thereacross. The resistor 20 has a much greater resistance than that of the sensing resistor 16 so that the output signal voltage E represents a mean machining current passing through the machining gap G, undergoing change in response and proportion thereto.

On the other hand, the rate of flow of the machining fluid F from the pump 10 is sensed by a rate signal generator 21 adapted to convert it to a signal voltage e which is fed to the signal processing circuit 15. The latter in this case is constituted by a dividing circuit to provide at its output a signal corresponding to the ratio $R = e/E$ which is fed to the control circuit 14. The control circuit 14 thus serves as a variable power supply for the electric motor 1 to drive the latter at a variable rate of rotation, thereby controlling the output pressure of the pump 10 such that the signal voltage $R = e/E$ input thereto is held at a predetermined value $R_O$.

Accordingly, when the machining current changes or fluctuates during a given machining operation or where the switching of the machining mode from one to another is desired in a sequence of machining operations, an automatic increase and decrease of the machining fluid F to the machining gap G or the region thereof in the work tank 3 is effected in proportion to the machining current passing through the gap G. The delivery of a required quantity of the machining fluid F to the machining zone is thereby assured and, since this quantity is held at a required minimum at all times, the temperature rise of the machining fluid F resulting from its circulation is held at its lowest, permitting machine components, the tool electrode 1 and the workpiece to suffer a least temperature rise while preventing the quality (i.e. conductivity or dielectricity) of the machining fluid F delivered to the machining zone from change or fluctuation so that a desired machining proceeds at an increased precision and accuracy.

Embodiments of the invention as designed to allow an automatic control are, of course, not limited to those illustrated in the drawing and described previously. Instead of the feed-back control as described, a programmed feed-forward control may be provided. Also, the rate of rotation of the pump 10 may be controlled either stepwise or continuously by a selector or dial switch and the closed-loop system as described may be altered by an open-loop system controllable responsive to one or more machining parameters to be employed variably.

There is thus provided in accordance with the present invention an improved fluid pumping control method and apparatus in a machine tool which assure an increased machining precision and eliminate disadvantages arising from an excessive heat loss with conventional machine tool fluid pumping systems.

I claim:

1. A method of controllingly supplying a machining fluid to a machining zone in an electroerosion machine having a reservoir for the machining fluid, a fluid conduit connecting between said reservoir and said machining zone, an electric motor and a pump with a rotor adapted to be driven by said electric motor, said method comprising the steps of:

applying an input to said electric motor for driving said pump to feed said machining fluid from said reservoir to said machining zone through said conduit;

sensing, during a given course of machining operation, a machining current passing between a tool electrode and a workpiece across a machining gap constituting said machining zone flushed with said machining fluid; and modifying said input to said electric motor for controlling the output pressure of said pump to regulate the rate of delivery of said machining fluid to said machining zone.

2. The method defined in claim 1, further comprising the steps of sensing the rate of machining fluid flow through said fluid feed conduit to provide a rate signal and modifying said input to said electric motor in response to said rate signal.

3. The method defined in claim 2 wherein said rate signal is converted to a first voltage signal and a second voltage signal is derived by the sensing of said machining current, said method further comprising the steps of forming a quotient of said first voltage signal and said second voltage signal to provide a third signal, and applying said third signal at said input to said electric motor.

4. An apparatus for controllingly supplying a machining fluid to a machining zone in a machine tool, comprising a reservoir for said machining fluid, a fluid feed conduit connecting between said reservoir and said machining zone, an electric motor having a variable input and a pump with a rotor adapted to be driven by said electric motor for feeding said machining fluid from said reservoir to said machining zone through said fluid conduit and means for modifying said input to said electric motor to control the output pressure of said pump, thereby regulating the rate of delivery of said machining fluid to said zone, said means including a switch adapted to switch from a given magnitude to another for switching the machining operation from one given mode to another.

5. An apparatus for controllingly supplying a machining fluid to a machining zone in a machine tool, comprising a reservoir for said machining fluid, a fluid feed conduit connecting between said reservoir and said machining zone, an electric motor having a variable input and a pump with a rotor adapted to be driven by said electric motor for feeding said machining fluid from said reservoir to said machining zone through said fluid conduit and means for modifying said input to said electric motor to control the output pressure of said pump, thereby regulating the rate of delivery of said machining fluid to said machining zone, said means including a first sensor adapted to sense the rate of flow of said machining fluid to provide a first signal and a control circuit responsive to said first signal for modifying said input to said electric motor.

6. The apparatus defined in claim 4 or claim 5 wherein said machine tool is an electroerosion machine and said means includes a second sensor adapted to sense the machining current passing through a machining gap constituting said machining zone filled with said machining fluid to provide a second signal and a control circuit responsive to said second signal for modifying said input to said electric motor.

7. A method of controllingly supplying a machining fluid to a machining zone in a machine tool having a reservoir for the machining fluid, a fluid feed conduit connecting between said reservoir and said machining zone, an electric motor and a pump with a rotor adapted to be driven by said electric motor, said method comprising the steps of:

applying an input to said electric motor for driving said pump to feed said machining fluid from said reservoir to said machining zone through said fluid conduit;

sensing the rate of the machining fluid flow through said fluid feed conduit to provide a rate signal; and modifying said input to said electric motor for controlling the output pressure of said pump to regulate the rate of delivery of said machining fluid to said machining zone in response to said rate signal.

8. An apparatus for controllingly supplying a machining fluid to a machining zone in an electroerosion machine, comprising a reservoir for said machining fluid, a fluid feed conduit connecting between said reservoir and said machining zone, an electric motor having a variable input and a pump with a rotor adapted to be driven by said electric motor for feeding said machining fluid from said reservoir to said machining zone through said fluid conduit and means for modifying said input to said electric motor to control the output pressure of said pump, thereby regulating the rate of delivery of said machining fluid to said machining zone, said means including a sensor for sensing the machining current passing through a machining gap constituting said machining zone filled with said machining fluid to provide a signal and a control circuit responsive to said signal for modifying said input to said electric motor.

* * * * *

REEXAMINATION CERTIFICATE (1232nd)
United States Patent [19]
Inoue

[11] B1 4,208,256
[45] Certificate Issued Apr. 3, 1990

[54] FLUID PUMPING CONTROL METHOD AND APPARATUS FOR MACHINE TOOLS

[75] Inventor: Kiyoshi Inoue, Tokyo, Japan

[73] Assignee: Inoue-Japax Research Incorporated, Japan

Reexamination Request:
No. 90/001,578, Aug. 17, 1988

Reexamination Certificate for:
Patent No.: 4,208,256
Issued: Jun. 17, 1980
Appl. No.: 8,093
Filed: Jan. 31, 1979

[30] Foreign Application Priority Data
Feb. 8, 1978 [JP] Japan .................................. 53-13768

[51] Int. Cl.$^4$ .......................... B23H 3/10; B23H 7/36; B23H 1/10
[52] U.S. Cl. ............................. 204/129.2; 204/129.7; 204/224 M; 204/229; 219/69 D
[58] Field of Search ........... 204/129.25, 129.7, 224 M, 204/129.2, 229; 219/69 G, 69 D

[56] References Cited

U.S. PATENT DOCUMENTS

| | | | |
|---|---|---|---|
| Re. 26,975 | 10/1970 | Borman et al. | 77/5 |
| 3,699,303 | 10/1972 | Kauffman et al. | 219/69 D |
| 3,731,043 | 5/1973 | Ullmann et al. | 219/69 V |

FOREIGN PATENT DOCUMENTS

| | | |
|---|---|---|
| 1071251 | 6/1960 | Fed. Rep. of Germany . |
| 39-1493 | 2/1964 | Japan . |

*Primary Examiner*—Donald R. Valentine

[57] ABSTRACT

A method and control system for a machining fluid pump in which the machining fluid is displaced by the pump to the machining site. The pump speed is controlled electrically, usually in response to a machining parameter or to a machining liquid parameter to minimize pumping of the liquid and heat rise therein.

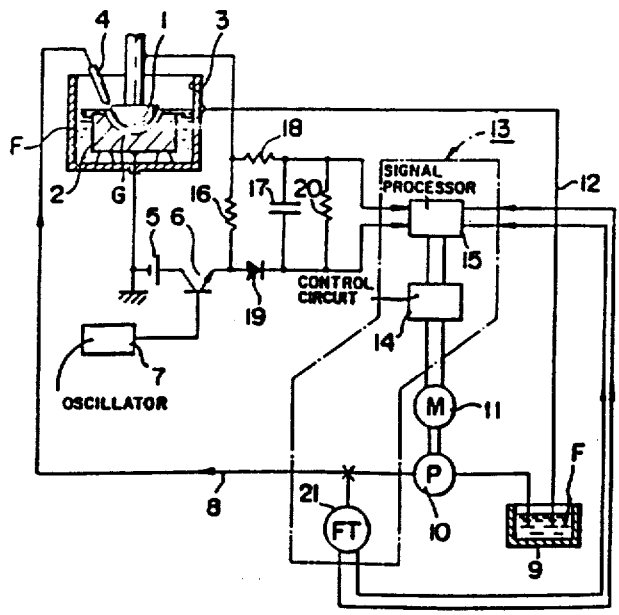

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 4–8 is confirmed.

Claim 1 is determined to be patentable as amended.

Claims 2 and 3, dependent on an amended claim, are determined to be patentable.

1. A method of controllingly supplying a machining fluid to a machining zone in an electroerosion machine having a reservoir for the machining fluid, a fluid conduit connecting between said reservoir and said machining zone, an electric motor and a pump with a rotor adapted to be driven by said electric motor, said method comprising the steps of:

applying an input to said electric motor for driving said pump to feed said machining fluid from said reservoir to said machining zone through said conduit;

sensing, during a given course of machining operation, a machining current passing between a tool electrode and a workpiece across a machining gap constituting said machining zone flushed with said machining fluid; and

*in response to said sensed machining current,* modifying said input to said electric motor for controlling the output pressure of said pump to regulate the rate of delivery of said machining fluid to said machining zone.

* * * * *